United States Patent [19]

Havens

[11] Patent Number: 5,924,072

[45] Date of Patent: Jul. 13, 1999

[54] KNOWLEDGE MANAGEMENT SYSTEM AND METHOD

[75] Inventor: Charnell T. Havens, McKinney, Tex.

[73] Assignee: Electronic Data Systems Corporation, Plano, Tex.

[21] Appl. No.: 08/779,267

[22] Filed: Jan. 6, 1997

[51] Int. Cl.[6] .................................................. G06F 17/60
[52] U.S. Cl. ..................................... 705/1; 705/11; 707/1
[58] Field of Search ................................ 705/14, 1, 7, 8, 705/11; 707/1, 2, 530; 345/331

[56] References Cited

U.S. PATENT DOCUMENTS

| 5,239,460 | 8/1993 | LaRoche | 364/401 |
| 5,706,452 | 1/1998 | Ivanov | 345/331 |

OTHER PUBLICATIONS

Stein, "A Method to Identify Candidates for Knowledge Acquisition" Journal of Management Information Systems, v. 9, n. 2, pp. 161–178, 1992.

Sequent Computer System, Business Wire, no author, whole document, Apr. 29, 1996.

Hiebeler, "Benchmarking Knowledge Management" Strategy and Leadership, v. 24, n. 2 p. 22(7), Mar. 1996.

Despres et al., "Human Resource Management in the Knowledge Age: Current Practice and Perspectives on the Future" Employee Relations, v. 17, n. 1, pp. 9–23, 1995.

Mullin, "Knowledge Management: A Cultural Evolution" Journal of Business Strategy v. 17, n. 5, p. 56(4), Sep. 1996.

Gopal et al., "Knowledge, Information, Learning and IS Manager" Computerworld, v. 29, n. 25 pp. ss1–ss7, Jun. 19, 1995.

Conference on Organizational Computing Systems, Milpitas, CA, Aug. 13–16, 1995, Mandviwalla, et al. entitled "Teambox: An Exploration of Collaborative Interoperability".

Primary Examiner—Melanie A. Kemper
Attorney, Agent, or Firm—L. Joy Griebenow; Baker & Botts L.L.P.

[57] ABSTRACT

A computer-based knowledge management system (10) includes a database (4, 30) that contains a knowledge item (8) and an activity record (32, 34, 36) that is associated with the knowledge item (8). An accessor (14) accesses the knowledge item (8) and, in response, communicates feedback information (2) concerning the knowledge item (8). A knowledge office (18) receives the feedback information (2), generates an incentive (72) in response to the feedback information (2), and stores the incentive (72) in the activity record (32, 34, 36).

20 Claims, 7 Drawing Sheets

FIG. 2b 34

- 60 → EMPLOYEE IDENTITY
- 62 → ORGANIZATIONAL UNIT IDENTITY FOR EMPLOYEE
- 64 → COMMUNICATION INFO FOR EMPLOYEE
- 66 → ACTIVITY TIMESTAMPS FOR EMPLOYEE
- 68 → ACTIVITY INDICATORS FOR EMPLOYEE
- 2 → FEEDBACK INFO ASSOCIATED WITH EMPLOYEE
- 70 → VALUES FOR KNOWLEDGE ITEMS SUBMITTED
- 72 → INCENTIVE INFO FOR EMPLOYEE

- 60 → EMPLOYEE IDENTITIES FOR ORGANIZATIONAL UNIT
- 62 → ORGANIZATIONAL UNIT IDENTITY
- 64 → COMMUNICATION INFO FOR EMPLOYEES FOR ORGANIZATIONAL UNIT
- 66 → ACTIVITY TIMESTAMPS FOR ORGANIZATIONAL UNIT
- 68 → ACTIVITY INDICATORS FOR ORGANIZATIONAL UNIT
- 2 → FEEDBACK INFO ASSOCIATED WITH ORGANIZATIONAL UNIT
- 70 → VALUES FOR KNOWLEDGE ITEMS SUBMITTED
- 72 → INCENTIVE INFO FOR ORGANIZATIONAL UNIT

} 74

KNOWLEDGE MANAGEMENT SYSTEM AND METHOD

TECHNICAL FIELD OF THE INVENTION

This invention relates in general to the field of managing information, and more particularly to a knowledge management system and method.

BACKGROUND OF THE INVENTION

Many people use information or knowledge as part of their function within a business or other organization. These knowledge workers acquire information from multiple sources and use the acquired information with respect to some business or other suitable activity to generate value for the organization. It is often desirable to monitor the activity of selected information within the organization and provide incentives to channel this activity according to the organization's particular needs. For example, an organization may provide various incentives for submitting information to a location accessible to others within the organization and monitor subsequent activity with respect to this information from a variety of perspectives.

As available information sources become larger and more complex to serve a variety of knowledge workers with particular information needs, incenting knowledge workers to make information available to others and monitoring subsequent activity concerning this information becomes increasingly important to the success of the organization. Existing systems for collecting and managing information have been inadequate to meet such needs, because they do not provide for effective submitting, accessing, updating, evaluating, incenting, and monitoring processes associated with the information or knowledge within the collective organization. As a result, prior systems do not adequately address the accrual of intellectual capital resulting from activity concerning this information or knowledge, which is an important aspect of succeeding in the modern global economy.

SUMMARY OF THE INVENTION

According to the present invention, the disadvantages and problems associated with managing information have been substantially reduced or eliminated.

According to one embodiment of the present invention, a computer-based knowledge management system includes a database containing a knowledge item and an activity record associated with the knowledge item. An accessor accesses the knowledge item and, in response, communicates feedback information concerning the knowledge item. A knowledge office of the knowledge management system receives the feedback information, generates an incentive in response to the feedback information, and stores the incentive in the activity record.

The knowledge management system and method of the present invention provide a number of important technical advantages. The knowledge management system of the present invention receives submitted knowledge items, maintains and provides access to knowledge items, updates knowledge items as appropriate, prompts for and receives feedback relating to knowledge items, monitors various activity concerning knowledge items, and generates a variety of incentives to encourage desirable activities associated with knowledge items. A value may be determined for a knowledge item in accordance with a quantitative or qualitative evaluation of the usefulness, influence, or other impact of the knowledge item on the ability of knowledge workers to perform their specified functions within an organization, providing an important technical advantage. Measuring the influence of knowledge items allows for the determination and evaluation of intellectual capital flowing within the organization, which may provide a means for measuring the success of the organization or determining areas in which the organization may improve.

Another important technical advantage of the present invention is that the knowledge management system generates incentives for desirable knowledge worker activities and stores these incentives in activity records that represent different perspectives from which information related to knowledge items may be viewed, appreciated, and applied to benefit the organization. Incentives such as incentive credits may be accumulated in an activity record associated with a knowledge worker and compared to a threshold value, with the possibility that an additional incentive will be generated for the knowledge worker in accordance with the comparison. Using appropriate incentives, the behavior of knowledge workers within the organization may be channeled in such a way that total intellectual capital is maximized, which is an important technical advantage in the modern global economy. Furthermore, the information accumulated in the activity records may provide a valuable tool for assessing the productivity, contribution, and performance of knowledge workers, which may in turn provide a criterion for evaluating knowledge workers regarding compensation, seniority, or other aspects of the relationship between the knowledge workers and the organization. Other important technical advantages are readily apparent to those skilled in the art from the following figures, description, and claims.

BRIEF DESCRIPTION OF THE DRAWINGS

For a complete understanding of the present invention and for further features and advantages thereof, reference is now made to the following description taken in conjunction with the accompanying drawings, in which:

FIGS. 2a through 2c illustrate exemplary records according to the present invention;

DETAILED DESCRIPTION OF THE INVENTION

Figure 1:
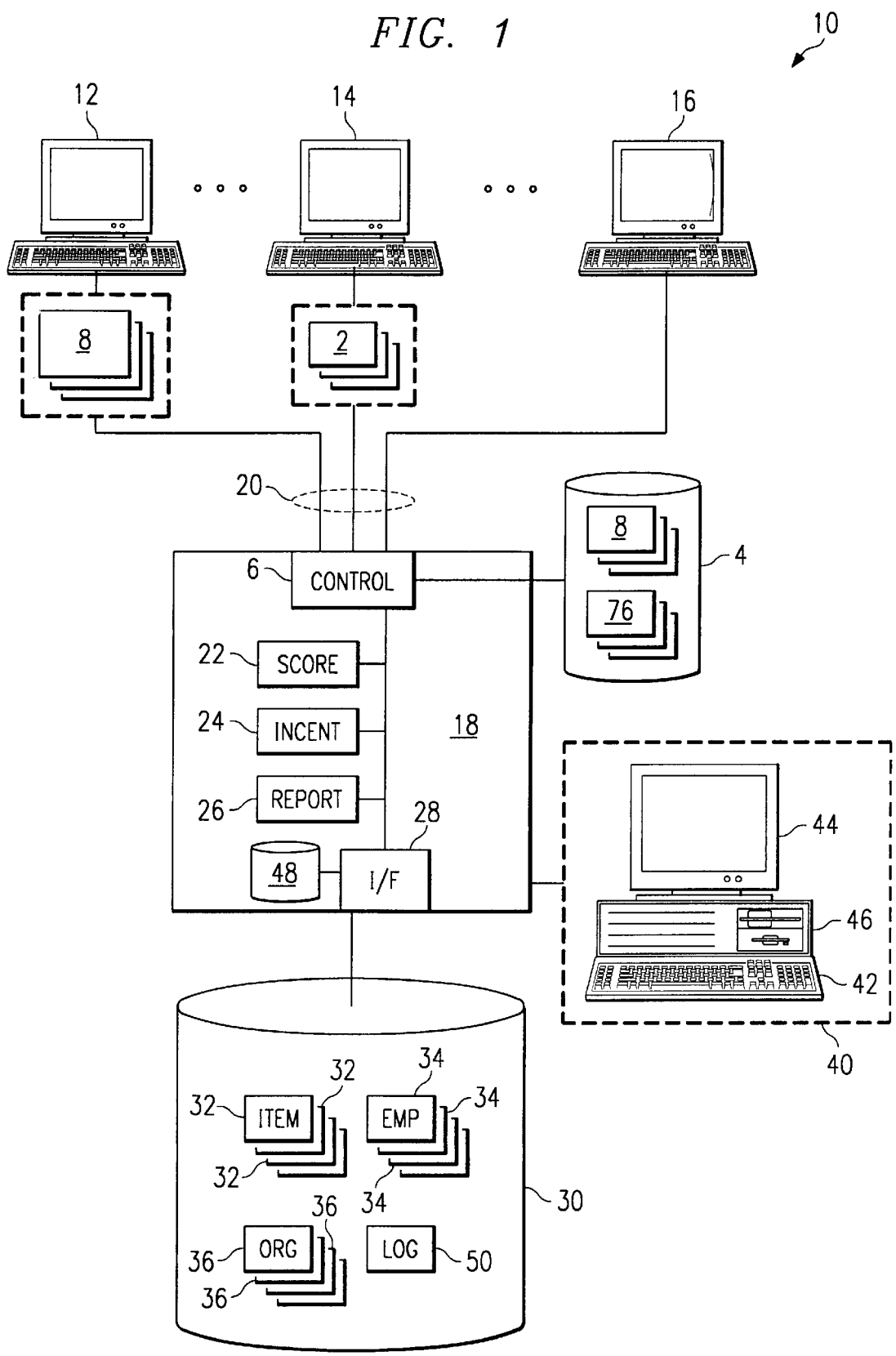
FIG. 1 illustrates an exemplary knowledge management system according to the present invention.

FIG. 1 illustrates a knowledge management system 10 that includes one or more submitters 12, one or more accessors 14, and one or more supervisors 16 within a business or other organization that communicate with knowledge office 18 using link 20. Submitter 12, accessor 14, and supervisor 16 may be autonomous or operated by one or more knowledge workers, managers, executives, or other employees, or any other persons associated in some manner with the organization. Although submitter 12, accessor 14, and supervisor 16 are discussed, system 10 may include as many submitters 12, accessors 14, and supervisors 16 as are necessary or desirable. In general, system 10 manages and monitors the communication, use, evaluation, and other activity concerning information or knowledge within the organization to increase the value of intellectual capital within the organization. To do this, system 10 receives submissions of knowledge items, maintains and provides access to the knowledge items, updates the knowledge items, collects feedback concerning the knowledge items, monitors activity concerning the knowledge items, and generates incentives for desirable activities associated with the knowledge items.

Submitter 12 submits one or more knowledge items 8 to knowledge office 18 using a submit form, which may reside on submitter 12 or another component of system 10, or in any other suitable manner. In general, a knowledge item is any data, graphic, document, process, or other compilation of textual, audiovisual, multimedia, or other information concerning a topic of past, current, or potential future interest, usefulness, or applicability to the function of knowledge workers within the organization. Submitter 12 may be the author, developer, or owner of knowledge item 8 or a surrogate having the authority to submit knowledge item 8 for the owner and receive information concerning knowledge item 8 instead of, or in addition to, the owner. The concept of "ownership" allows submitter 12 or another owner of knowledge item 8 to monitor the usage of knowledge item 8 and to maintain the currency of knowledge item 8, possibly to the exclusion of some or all other knowledge workers within the organization.

In one embodiment, accessor 14 is a knowledge worker that may access one or more knowledge items 8 maintained by knowledge office 18 in performing specified functions for the organization, such as an instructor, an accountant, an attorney, an engineer, a marketing representative, or any other organization employee. Supervisor 16 may be an executive, manager, or other person responsible for or in some manner interested in the productivity, contribution, or performance of submitter 12, accessor 14, or both submitter 12 and accessor 14. System 10 may operate in a client/server environment in which submitter 12, accessor 14, and supervisor 16 are clients of a server associated with knowledge office 18, may operate in a peer-to-peer computing environment, or may operate in any other suitable environment. Submitter 12, accessor 14, and supervisor 16 communicate with knowledge office 18 using hardware and software associated with link 20.

After using or applying knowledge item 8, accessor 14 may reuse or reapply knowledge item 8 or an updated version of knowledge item 8 according to particular needs. In one embodiment, when accessor 14 accesses knowledge item 8 to use or apply knowledge item 8, accessor 14 may be provided an opportunity to indicate whether accessor 14 desires to receive subsequent updates to knowledge item 8. If updates are requested, an update list is created for accessor 14 and accessor 14 receives or is notified concerning updates to knowledge items 8 on the update list for accessor 14. Updating of knowledge items 8 is discussed more fully below with reference to FIGS. 4a and 4b.

Link 20 may include any electronic mail or other communications system operating on one or more computers or other processing devices. Link 20 may include OFFICE VISION MAIL, LOTUS NOTES, MICROSOFT MAIL, an interactive web page, or any other suitable communications application or other tool. Link 20 includes hardware and software to receive, transmit, send, forward, reply to, store, archive, or otherwise communicate information concerning knowledge items 8 between submitter 12, accessed 14, supervisor 16, and knowledge office 18. Link 20 may include a dedicated or switched connection to communicate information using a public switched telephone network (PSTN), a satellite link, a microwave link, a connection through a local area network (LAN), metropolitan area network (MAN), wide area network (WAN), a global computer network such as the Internet, or other suitable network, or any other appropriate connection or link.

In one embodiment, components of system 10 communicate over the Internet using the Worldwide Web (WWW), file transfer protocol (FTP), Telnet, Usenet, a Gopher or Archie utility, a bulletin board, electronic mail, or any other communication technique. For example, components of system 10 may maintain and execute a browser or other application for accessing and communicating information addressed by a uniform resource locator (URL) using link 20. Link 20 may further include protocol conversion and data processing capabilities allowing link 20 to facilitate communications between submitter 12, accessed 14, supervisor 16, and knowledge office 18.

Throughout this discussion, storage and communication of knowledge items 8 may be performed using any suitable format, structure, or other arrangement of information that includes machine-readable or user-readable text. In one embodiment, knowledge items 8 comprise information for communication over the Internet written in hypertext mark-up language (HTML), HTML+, standard generalized mark-up language (SGML), virtual reality mark-up language (VRML), or any other appropriate content development language. Knowledge items may also include program code, such as JAVA applets or other suitable self-executing code.

Database 30 is a relational or other database that contains one or more databases, libraries, files, lists, or other arrangement of information and has an associated database management system (DBMS) for managing access to the resources of database 30. Database 30 may include fixed or removable storage media at one or more locations or processing devices within system 10, such as random access memory (RAM), read only memory (ROM), magnetic computer disks, CD-ROM, or any other appropriate volatile or non-volatile memory. Database 30 contains multiple knowledge item records (ITEM) 32, employee records (EMP) 34, organization records (ORG) 36, and log records (LOG) 50, each containing information that concerns one or more previously submitted knowledge items 8. The contents of records 32, 34, 36, and 50 are discussed more fully below with reference to FIGS. 2a through 2c. In a particular embodiment, records 32, 34, 36, and 50 each represent a different perspective from which the activity, content, and other information associated with knowledge items 8 may be viewed and appreciated.

Knowledge office 18 includes control module (CONTROL) 6, scoring module (SCORE) 22, incentive module (INCENT) 24, and reporting module (REPORT) 26 that each periodically access database 30 using interface 28 of knowledge office 18. In a particular embodiment, knowledge office 18 is a server that monitors activities of submitter 12, accessor 14, and supervisor 16 associated with databases 4 and 30. Interface 28 may include appropriate hardware and software to communicate using a dedicated or switched connection to a PSTN, a connection through a LAN, MAN, WAN, a global computer network such as the Internet, or other suitable network or communications link. Interface 28 may include protocol conversion and data processing capabilities that allow for communications between control module 6, scoring module 22, incentive module 24, recording module 26, and the DBMS associated with database 30. In one embodiment, interface 28 has access to communication parameters 48 to communicate information between knowledge office 18 and database 30. For each database, library, file, or listing in database 30, communication parameters 48 maintain access information that may include, for example, and not by way of limitation: a username, a password, a telephone number, communications port settings, library and file paths, protocol information, database specifications, and any other information suitable for accessing database 30 and communicating information between knowledge office 18 and database 30.

Control module 6 receives knowledge items 8 and other submission information from submitter 12, receives access information and feedback information 2 from accessor 14, and communicates responsive information to submitter 12, accessor 14, and supervisor 16 according to operation of system 10. Control module 6 also manages communications between scoring module 22, incentive module 24, reporting module 26, and database 30. In one embodiment, control module 6 establishes knowledge envelope 76 corresponding to each submitted knowledge item 8 that contains information from submitter 12 associated with knowledge item 8 and information that control module 6 generates concerning knowledge item 8. Knowledge envelope 76 corresponding to each knowledge item 8 may contain, without limitation: a title for knowledge item 8; a description, summary, or abstract of the contents of knowledge item 8; a URL or any other appropriate location designator for addressing and accessing knowledge item 8; and any other information concerning knowledge item 8 that is suitable for inclusion in knowledge envelope 76. Control module 6 stores and maintains knowledge item 8 in database 4 or in another suitable location, together with or separate from the corresponding knowledge envelope 76. Database 4 may be integral to or separate from database 30.

In addition, control module 6 establishes knowledge item records 32, employee records 34, organization records 36, and log records 50 in database 30. Other appropriate records may also be established, for example, to identify knowledge items 8 submitted within a recent period or to provide a dictionary, glossary, or other tool for searching knowledge items 8 according to particular subject matter. Control module 6 also coordinates the addition, deletion, updating, and other manipulation of records 32, 34, 36, and 50 in database 30 in cooperation with the associated DBMS, including the generation of update lists for accessors 14, as discussed above. Further, control module 6 communicates information concerning incentives between components of knowledge office 18 and other components of system 10, such as submitter 12, accessor 14, and supervisor 16, according to the activity concerning knowledge items 8. The present invention contemplates control module 6 or other suitable component of system 10 to determine, specify, or otherwise control operation of knowledge office 18 in any suitable manner.

Scoring module 22 communicates with control module and database 30 to calculate or otherwise determine values for knowledge items 8 according to feedback information 2 from accessor 14. Accessor 14 may provide feedback information 2 to knowledge office 18 and scoring module 22 using a feedback form residing on accessor 14 or communicated to accessor 14 from control module 6 of knowledge office 18 in response to accessor 14 accessing knowledge item 8. The feedback form may be the same as the submit form used to submit knowledge items 8 discussed above, except for the fact that accessor 14 will choose a different option than submitter 12. The value that scoring module 22 determines for each knowledge item 8 may include any quantitative or qualitative evaluation of the usefulness, applicability, or other value of knowledge item 8, as reflected by feedback information 2 from accessor 14.

For example, the quantitative numeric evaluation of knowledge item 8 may include an impact value reflecting the actual, estimated, or projected savings in time, money, or other measurable quantity that is attributable to the use or application of knowledge item 8. In the alternative, a qualitative ranking evaluation may include a qualitative assessment of the impact value of knowledge item 8 relative to other knowledge items 8 that accessor 14 has used or with which accessor 14 is familiar. The present invention contemplates any suitable technique for evaluating the influence of knowledge items 8 or portions thereof on the organization or its knowledge workers in accordance with feedback information 2 from accessor 14. Measuring the collective influence of knowledge items 8 allows for the determination and evaluation of the intellectual capital flowing within the organization, which may provide a means for measuring the organization's success or determining areas in which the organization may improve.

Incentive module 24 accesses records in database 30 periodically or in response to an appropriate trigger to generate incentives according to activity associated with knowledge items 8. Triggers for generation of incentives may include, without limitation: submitter 12 submitting knowledge item 8 to knowledge office 18; knowledge office 18 receiving feedback information 2 for knowledge item 8 from accessor 14 or other evidence that accessor 14 used or applied knowledge item 8; accumulation of incentives for submitter 12, accessor 14, supervisor 16, or one or more organizational units associated with submitter 12, accessor 14, or supervisor 16 reaching a threshold level; or any other suitable trigger. For example, knowledge office 18 may generate an incentive for submitter 12 if feedback information 2 from accessor 14 indicates that accessor 14 found knowledge item 8 especially useful. Incentives may include any acknowledgments, commendations, tangible or intangible rewards, incentive credits for accumulation, or other forms of recognition that the organization believes will incent or otherwise encourage desirable activity from its knowledge workers with respect to knowledge items 8. Incentive module may also generate incentives according to values generated by scoring module 22 according to content of feedback information 2. For example, a value reflecting positively on knowledge item 8 might cause incentive module 24 to generate ten incentive credits for association with employee record 34 for submitter 12, while a value that reflects negatively on knowledge item 8 might only be worth two incentive credits or possibly even a negative number of incentive credits for subtraction from an accumulated incentive credit total for submitter 12.

In one embodiment, each time submitter 12 submits a knowledge item 8 to knowledge office 18, incentive module 24 generates an incentive for submitter 12, for supervisor 16 of submitter 12, and for organizational units associated with submitter 12, for example, a strategic business unit (SBU), department, or team to which submitter 12 reports or is otherwise associated. Incentive module 24 may also generate incentives for the owner of knowledge item 8, if the owner is not submitter 12. Each time accessor 14 accesses knowledge office 18 to use or apply one or more knowledge items 8 and provides feedback information 2 to knowledge office 18 concerning knowledge item 8, incentive module 24 may generate an incentive for accessor 14, for supervisor 16 of accessor 14, and for organizational units associated with accessor 14. Different degrees or types of use or application may warrant different degrees or types of incentives. Generating incentives for supervisor 16 and for organizational units associated with submitter 12 and accessor 14 for activities of submitter 12 and accessor 14 identifies and encourages sponsorship of these desirable activities to the benefit of the organization. Incentives such as incentive credits, the total number of incentives, or the total number of incentives of a particular type may be accumulated in employee records 34 and organization records 36 for comparison with threshold levels for the generation of further incentives.

Reporting module 26 accesses employee records 34 and organization records 36 in database 30 periodically or in response to specific requests to retrieve information that concerns corresponding knowledge workers for communication to supervisor 16. In one embodiment, the retrieval process is coordinated with a periodic employee review process of the organization to give supervisor 16 a valuable tool for assessing the productivity, contribution, and performance of knowledge workers with respect to intellectual capital of the organization. For example, reporting module 26 may automatically generate an activity summary and a business impact summary for a knowledge worker, such as accessor 14, and communicate the activity summary and business impact summary to supervisor 16 a predetermined time before the knowledge worker is to receive a performance review. This information might then provide a criterion for evaluating the knowledge worker regarding compensation, seniority, or other aspects of the relationship between the knowledge worker and the organization. Supervisor 16 may also gain insight into the performance of supervisor 16 in managing knowledge workers and in encouraging knowledge workers to share information with each other to the benefit of the organization. Using appropriate incentives, the behavior of knowledge workers may be channeled in such a way that total intellectual capital is maximized.

Knowledge office 18 may operate on one or more computers 40 that are integral to or separate from the hardware and software that support submitter 12, accessor 14, supervisor 16, link 20, and database 30. Computer 40 may include an input device 42, such as a keypad, touch screen, microphone, or other device to accept information. An output device 44 may convey information associated with the operation of system 10, including digital or analog data, visual information, or audio information. Both input device 42 and output device 44 may include fixed or removable storage media, such as magnetic computer disks, CD-ROM, or other suitable media to both receive output from and provide input to system 10. Computer 40 may have a processor 46 and an associated volatile or non-volatile memory to execute instructions and manipulate information in accordance with the operation of system 10. The present invention contemplates control module 6, scoring module 22, incentive module 24, and reporting module 26 being integral to or separate from knowledge office 18 or being integral to or separate from one another. For example, the present invention contemplates multiple modules that perform the functions of control module 6.

In operation of system 10, submitter 12 submits a knowledge item 8 to knowledge office 18 using a submit form or otherwise. Control module 6 of knowledge office 18 receives knowledge item 8, establishes knowledge envelope 76 for knowledge item 8, stores knowledge item 8 in knowledge database 4, and establishes an item record 32 for knowledge item 8 in database 30. Incentive module 24 generates one or more incentives for communication to submitter 12 and supervisor 16, for association with employee records 34 in database 30 corresponding to submitter 12 and supervisor 16, or any combination of the above. At some subsequent time, accessor 14 establishes a knowledge worker session to access knowledge item 8 and uses or applies knowledge item 8 to perform a specified function associated with the organization. Accessor 14 may request that knowledge item 8 be updated as appropriate and may also indicate whether accessor 14 will provide feedback information 2 concerning knowledge item 8 to knowledge office 18.

If accessor 14 indicates that accessor 14 will provide feedback information 2 for knowledge item 8, accessor 14 may provide feedback information 2 using a feedback form or in some other manner. If accessor 14 does not provide feedback information 2 as indicated, or if accessor 14 does not agree to provide feedback information 2, control module 6 may prompt accessor 14 periodically to obtain feedback information 2 from accessor 14. If accessor 14 provides feedback information 2, with or without prompting from knowledge office 18, control module 6 receives feedback information 2 from accessor 14 and transmits at least a portion of feedback information 2 to scoring module 22 for evaluation. In response to feedback information 2 or any other suitable communication from control module 6 or from scoring module 22, incentive module 24 generates incentives for communication to submitter 12 and supervisor 16, for association with employee records 34 in database 30 for submitter 12 and supervisor 16, or any combination of the above. Control module 6 may also associate some or all feedback information 2 directly with item record 32 in database 30 corresponding to knowledge item 8.

Scoring module 22 receives feedback information 2 from control module 6 and evaluates feedback information 2 to generate values for knowledge item 8, which are stored in item record 32 for knowledge item 8, in employee records 34 for submitter 12 and supervisor 16 of submitter 12, and in organization records 36 for organizational units associated with submitter 12 and supervisor 16, in any combination. In addition, incentive module 24 may generate appropriate incentives for submitter 12, accessor 14, and supervisors 16 for submitter 12 and accessor 14 that are communicated to submitter 12, accessor 14, and supervisor 16, associated with the appropriate employee records 34 and organization records 36 according to the existence, content, or quality of feedback information 2, or handled in any other suitable manner.

For example, if feedback information 2 is positive with respect to knowledge item 8 or aspects of knowledge item 8, submitter 12 and supervisor 16 of submitter 12 may receive incentives, and item record 32, employee records 34, and organization records 36 may be updated accordingly. Similarly, if feedback information 2 is relatively thorough and contains thoughtful analysis concerning knowledge item 8, whether feedback information 2 is positive or negative with respect to knowledge item 8, then accessor 14 and supervisor 16 of accessor 14 may receive incentives, and the appropriate item record 32, employee records 34, and organization records 36 may be updated. In this manner, knowledge workers are incented to share, use or apply, and evaluate information to the benefit of the organization, while the organization is able to monitor such activity to target areas for improvement and quantify the intellectual capital flowing within the organization.

In a particular embodiment, each time an accessor 14 accesses knowledge item 8, an accessor 14 provides feedback information 2 concerning knowledge item 8, or an incentive is generated with respect to activity concerning knowledge item 8, control module 6 updates an activity history for appropriate knowledge item records 32, employee records 34, organization records 36, and log records 50 in database 30, as discussed more fully below with reference to FIGS. 2a through 2c. For example, when control module 6 generates item record 32, control module 6 may associate identity, communication, and activity information regarding submitter 12, supervisor 16 of submitter 12, organizational units for submitter 12, and knowledge item 8 with item record 32, appropriate employee records 34 and organization records 36, and log record 50. When accessor 14 accesses knowledge item 8 or provides feedback information 2 for knowledge item 8, control module 6 may similarly associate identity, communication, and activity information regarding accessor 14, supervisor 16 of accessor 14, organizational units for accessor 14, and knowledge item 8 with item record 32, appropriate employee records 34 and organization records 36, and log record 50. Likewise, when scoring module 22 evaluates feedback information 2 for knowledge item 8 or when incentive module 24 generates incentives for activity concerning knowledge item 8, control module 6 may update the appropriate item record 32, employee records 34 and organization records 36, and log record 50. In one embodiment, log record 50 includes the activity history for all knowledge items 8 maintained by knowledge office 18 to allow for comprehensive monitoring of intellectual capital flowing within the organization.

Figure 2A:
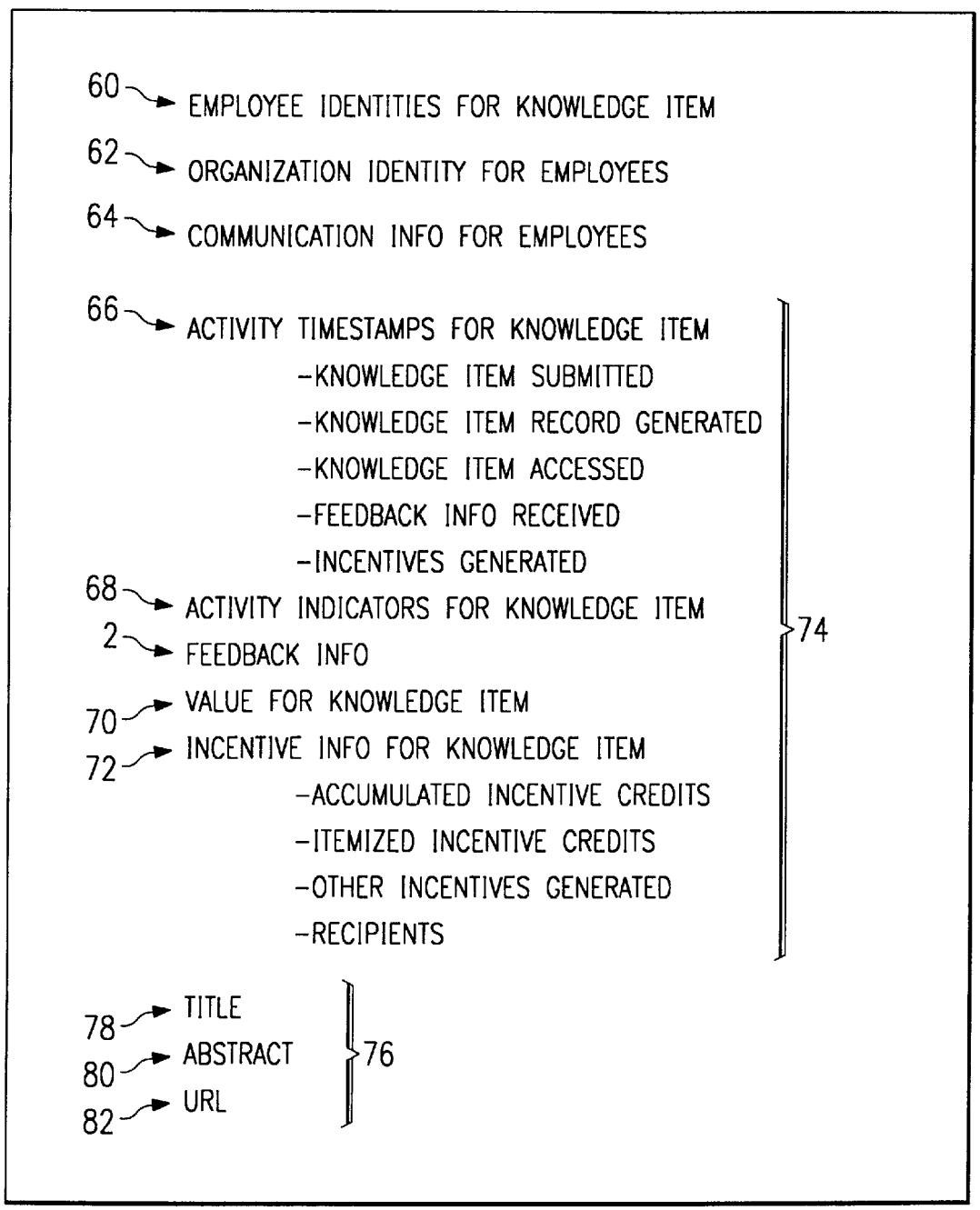

FIGS. 2a through 2c illustrate exemplary knowledge item records 32, employee records 34, and organization records 36 stored in database 30. Referring to FIG. 2a, for each knowledge item 8, corresponding knowledge item record 32, may include, without limitation: the identity of submitter 12, of an owner or surrogate for knowledge item 8 if not submitter 12, and of supervisor 16 for submitter 12, referred to generally as employee identities 60; the identity 62 of one or more organizational units for submitter 12, an owner or surrogate, or supervisor 16; a telephone number, network address, or other communication information 64 for submitter 12, for an owner or surrogate, or for supervisor 16; activity timestamps 66 indicating when knowledge item 8 was submitted, knowledge item record 32 was generated, knowledge item 8 was accessed, feedback information 2 concerning knowledge item 8 was received, incentives were generated for activity concerning knowledge item 8, or indicating the occasion of any other suitable activity with respect to knowledge item 8; a description or indicator 68 of each occurrence of activity concerning knowledge item 8; feedback information 2 from accessor 14 for knowledge item 8, in whole or in part; a value 70 for knowledge item 8 that scoring module 22 determines in accordance with the content of feedback information 2; accumulated, itemized, or other incentive information 72 for incentives generated in connection with knowledge item 8, for example, accumulated incentive credits that have been generated for activity concerning knowledge item 8, information regarding other types of incentives generated for activity concerning knowledge item 8, and information concerning the recipients of the incentives; and any other information concerning knowledge item 8 that is suitable for storage in knowledge item record 32.

Activity timestamp 66, activity indicator 68, feedback information 2, value 70, and incentive information 72 may be referred to collectively as an activity record 74 for knowledge item 8. Since incentive information 72 includes either the incentives themselves, for example, accumulated incentive credits, or information regarding the incentives, such as the generation of a reward, storing an incentive in activity record 74 of knowledge item record 32 is meant to include storing the incentive itself for accumulation in activity record 74 or storing information concerning the incentive in activity record 74. As discussed above with reference to FIG. 1, knowledge envelope 76 for knowledge item 8 may be stored in association with or separate from item record 32 in database 30 or knowledge item 8 in knowledge database 4. Knowledge envelope 76 may include, without limitation: a title 78 for knowledge item 8; a description, summary, or abstract 80 of the content of knowledge item 8; a URL or other location designator 82 for addressing and accessing knowledge item 8; and any other appropriate information concerning knowledge item 8.

Referring to FIG. 2b, for each submitter 12, owner or surrogate, accessor 14, and supervisor 16, referred to generally as the employee, corresponding employee record 34 may include, without limitation: an employee identity 60; the identity 62 of one or more organizational units for the employee; a telephone number, network address, or other communication information 64 for the employee; an activity timestamps 66 indicating when the employee performed a particular activity concerning one or more knowledge items 8, such as submitting knowledge item 8, updating knowledge item 8, accessing knowledge item 8, providing feedback information 2 concerning knowledge item 8, or any other appropriate activity; a description or indicator 68 of each instance of activity for the employee with respect to one or more knowledge items 8; feedback information 2 received from the employee if the employee is accessor 14, received from accessor 14 that is associated with the employee if the employee is supervisor 16, regarding knowledge items 8 submitted by the employee if the employee is submitter 12, or regarding knowledge items 8 submitted by submitter 12 associated with the employee if the employee is supervisor 16; values 70 for knowledge items 8 that are associated with the employee in some manner that scoring module 22 determines according to the content of feedback information 2; incentive information 72 for incentives generated for activities of the employee, such as accumulated incentive credits or other information concerning incentives that are associated with the employee; and any other information concerning these employees that is suitable for storage in employee records 34.

As for knowledge item records 32, activity timestamps 66, activity indicators 68, feedback information 2, values 70, and incentive information 72 may be referred to collectively as activity record 74 for the employee. The present invention contemplates employee record 34 including a separate activity record 74 for each knowledge item 8 associated with the employee, for example, each knowledge item 8 the employee submitted, updated, accessed, provided feedback information 2 concerning, or received an incentive for activity concerning. Also as for knowledge item record 32, storing an incentive in activity record 74 of employee record 34 is meant to include either storing the incentive itself for accumulation in activity record 74 or storing information concerning the incentive in activity record 74. The present invention contemplates any suitable technique for arranging, ordering, compiling, storing, or organizing the information contained in employee record 34.

Referring to FIG. 2c, for each SBU, department, team, or other organizational unit of the organization, corresponding organization record 36 may include, without limitation: employee identities 60 of submitters 12, owners or surrogates, accessors 14, and supervisors 16 associated with the organizational unit, as discussed above; identity 62 of the organizational unit; telephone numbers, network addresses, and any other communication information 64 for employees for the organizational unit; activity timestamps 66 indicating when employees for the organizational unit performed activity concerning one or more knowledge items 8, as discussed above; description or indicator 68 of each occurrence of activity with respect to knowledge items 8 for the organizational unit; feedback information 2, in whole or in part, associated with the organizational unit, for example, from accessor 14 within the organizational unit or concerning knowledge item 8 submitted by submitter 12 within the organizational unit; values 70 that scoring module 22 determines for knowledge items 8 submitted by submitters 12 within the organizational unit according to feedback information 2; incentive information 72 for the organizational unit, for example, accumulated incentive credits for the organizational unit or information relating to incentives generated for the organizational unit or for employees within the organizational unit; and any other information suitable for storage in organization records 36 in database 30.

As for knowledge item records 32 and employee records 34, activity record 74 for the organizational unit includes activity timestamps 66, activity indicators 68, feedback information 2, values 70, and incentive information 72 for the organizational unit. Organization record 36 may have separate activity records 74 for each knowledge item 8 associated with the organizational unit or each employee within the organizational unit. Also as discussed above with reference to FIGS. 2a and 2b, storing incentives in activity record 74 of organizational record 36 is meant to include storing the incentives themselves for accumulation in activity record 74 or storing information concerning the incentives in activity record 74. Since activity records 74 in knowledge item record 32, employee records 34, and organization records 36 all include information concerning at least one knowledge item 8, all activity records 74 are associated with at least one knowledge item 8. Moreover, the entirety of each item record 32, employee record 34, or organization record 36 may be considered an activity record for purposes of this discussion, because each item record 32, employee record 34, and organization record 36 relates to activity concerning at least one knowledge item record 8. The present invention contemplates arranging, storing, or organizing the information contained in organization records 36 in any suitable manner.

Log record 50 corresponds to and contains information concerning all activity associated with knowledge office 18 and knowledge items 8. Activities for which log record 50 contains information may include, for example, and not by way of limitation: submitting, updating, and accessing knowledge items 8; providing feedback information 2 that concerns knowledge items 8; knowledge office 18 prompting for, responding to, or generating incentives for any of the above activities; or any other information suitable for monitoring activity concerning knowledge office 18 and knowledge items 8.

Figure 3:
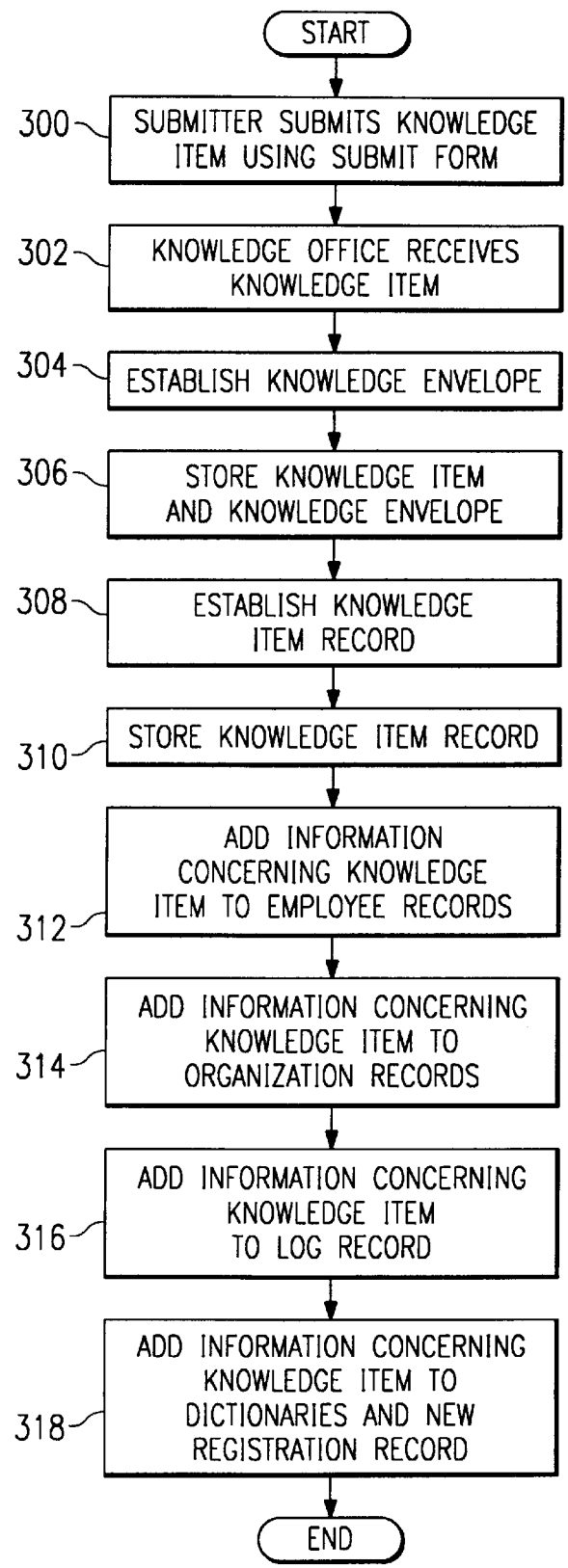
FIG. 3 is a flowchart illustrating an exemplary method of submitting a knowledge item according to the present invention.

FIG. 3 is a flowchart illustrating an exemplary method of submitting knowledge item 8 to knowledge office 18 according to the present invention. The method begins at step 300, where submitter 12 submits one or more knowledge items 8 to knowledge office 18 using a submit form or otherwise. Knowledge office 18 receives knowledge item 8 at step 302 and, at step 304, control module 6 of knowledge office 18 establishes knowledge envelope 76 for knowledge item 8. At step 306, control module 6 stores knowledge item 8 and knowledge envelope 76, separately or together, in database 4 or at another suitable location for subsequent access. Control module 6 establishes knowledge item record 32 for knowledge item 8 at step 308 and stores item record 32 in database 30 at step 310.

At step 312, control module 6 of knowledge office 18 adds appropriate information concerning knowledge item 8 or activity related to knowledge item 8 to employee records 34 for submitter 12, any owner or surrogate if not submitter 12, and supervisor 16 for submitter 12. Similarly, at step 314, control module 6 adds the appropriate information to organization records 36 for an SBU, department, team, or other organizational unit associated with submitter 12, any owner or surrogate if not submitter 12, or supervisor 16 for submitter 12. At step 316, control module 6 adds the appropriate activity information to log record 50. The information stored in item record 32, employee records 34, organization records 36, and log record 50 in database 30 was discussed more fully above with reference to FIGS. 2a through 2c. At step 318, control module 6 may also add appropriate information concerning knowledge item 8 to a record that identifies recently submitted knowledge items 8 or that provides a dictionary, glossary, or other tool for searching knowledge items 8, and the method ends. the present invention contemplates steps 304 through 318 in any suitable order or simultaneously.

Figure 4A:
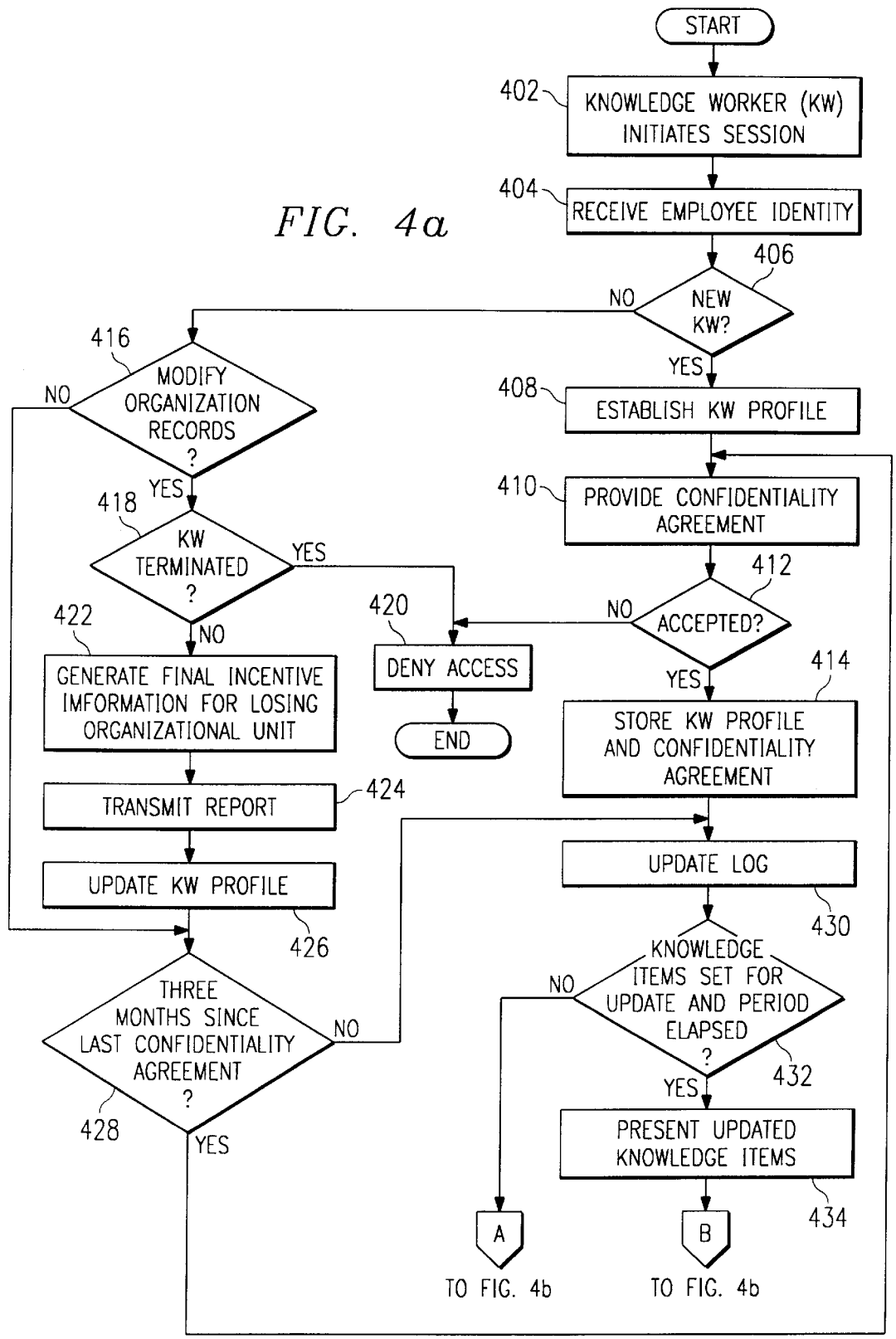
FIGS. 4a and 4b are a flowchart illustrating an exemplary method for managing knowledge according to the present invention.
Figure 4B:
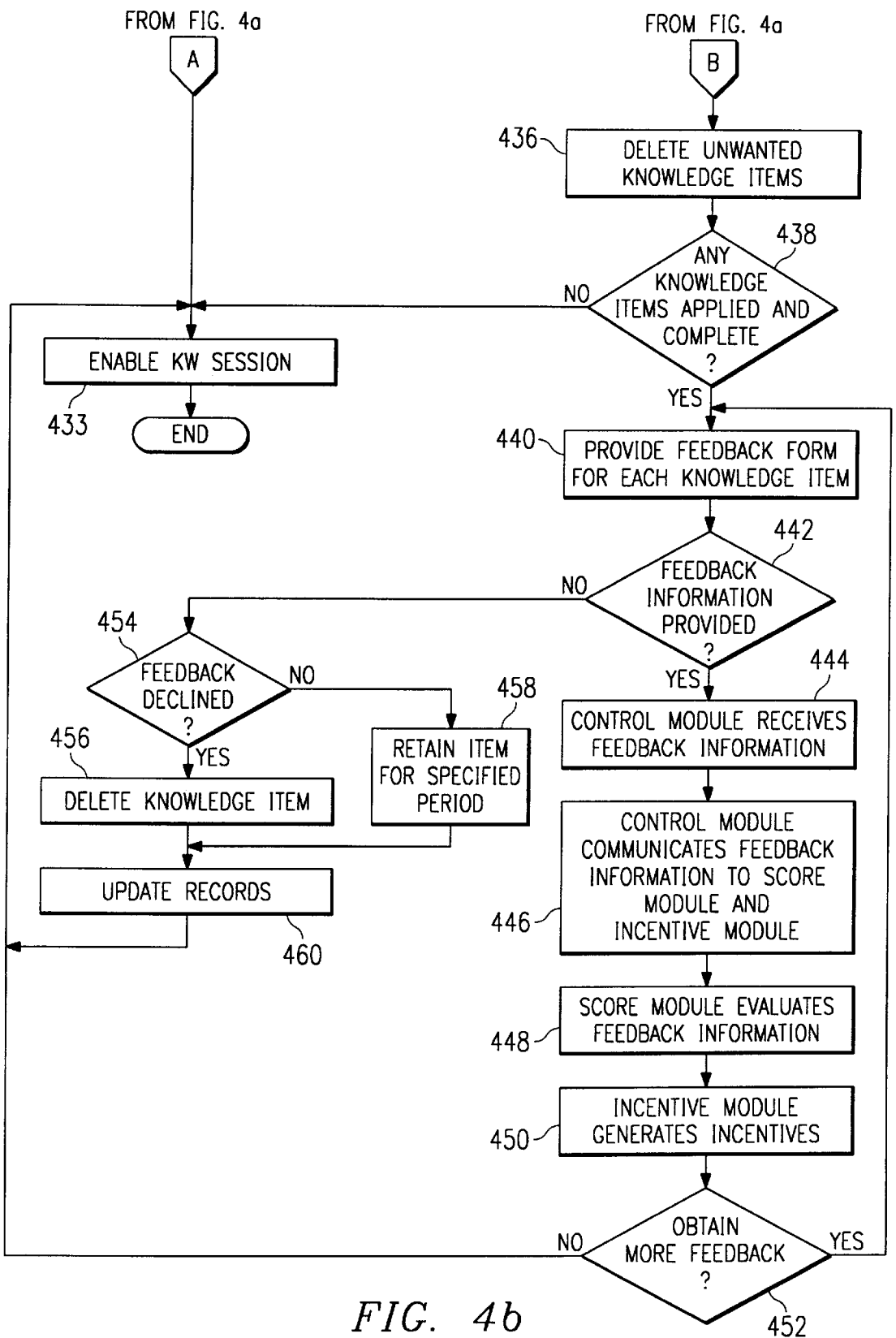

FIGS. 4a and 4b are a flowchart illustrating an exemplary method for managing knowledge according to the present invention. The method begins at step 402, where a knowledge worker, such as accessor 14 (KW in FIGS. 4a and 4b) initiates a knowledge worker session with knowledge office 18 to access one or more knowledge items 8 that knowledge office 18 maintains. Accessor 14 may initiate the session by providing employee identity 60, a password, and other suitable identification information associated with accessor 14. At step 404, control module 6 receives employee identity 60 from accessor 14 using link 20. If accessor 14 is new to knowledge office 18 at step 406, such that control module 6 has not previously established a knowledge worker profile for accessor 14, control module 6 establishes a knowledge worker profile for accessor 14 at step 408. The knowledge worker profile for accessor 14 may include employee identities 60 for accessor 14 and for supervisor 16 of accessor 14, communication information 64 for accessor 14 and supervisor 16, and any other suitable information relating to accessor 14. The present invention contemplates knowledge worker profile for accessor 14 being employee record 36 for accessor 14.

At step 410, control module 6 provides accessor 14 with a confidentiality agreement describing the terms and conditions that accessor 14 must accept to access knowledge office 18 and its resources. The confidentiality agreement may be presented to accessor 14 as an HTML document on a graphical user interface (GUI) associated with accessor 14 or in any other suitable manner. If accessor 14 accepts the confidentiality agreement at step 412, for example, by entering appropriate information on a keypad associated with accessor 14, control module 6 establishes and stores a knowledge worker profile for accessor 14 at step 414, separate from or together with the agreement. The method then proceeds to step 430, where control module 6 updates log record 50 to reflect the fact that accessor 14 accessed knowledge office 18. If accessor 14 does not accept the confidentiality agreement at step 412, control module 6 denies accessor 14 access to knowledge office 18 and its resources at step 420, and the method ends.

If accessor 14 is not new to knowledge office 18 at step 406, control module 6 need not establish a knowledge worker profile for accessor 14 and the method proceeds to step 416. If the relationship between accessor 14 and the organization has been terminated or accessor 14 has changed organizational units within the organization, appropriate organization records 36 should be modified at step 416 to reflect this information. If the relationship has been terminated at step 418, rather than accessor 14 changing organizational units within the organization, accessor 14 is denied access to knowledge office 18 at step 420, and the method ends. If accessor 14 is still associated with the organization at step 418, control module 6 generates final incentive information at step 422 for the previous organizational unit associated with accessor 14. In one embodiment, the final incentive information may include, in whole or in part, incentive information 72 attributable to accessor 14 for the previous organizational unit. At step 424, control module transmits a report reflecting the final incentive information to supervisor 16 of accessor 14 or any other appropriate person. Control module 6 updates the knowledge worker profile for accessor 14 at step 426 to reflect movement of accessor 14 between the organizational units since accessor 14 last communicated with knowledge office 18.

At step 428, if three months or another appropriate period has elapsed since accessor 14 was last presented with and accepted a confidentiality agreement as discussed above, the method returns to step 410, where control module 6 provides the confidentiality agreement to accessor 14. If less than three months or another specified period have elapsed at step 428, control module 6 updates log record 50 at step 430 to reflect the fact that accessor 14 accessed knowledge office 18. If accessor 14 has not previously set at least one knowledge item 8 for update or a threshold period associated with an update request has not elapsed at step 438, control module 6 enables a knowledge worker session for accessor 14 at step 433 to allow accessor 14 to use or apply one or more knowledge items 8 as discussed above with reference to FIG. 1, and the method ends. If accessor 14 has previously set one or more knowledge items 8 for update and a threshold period associated with the update request has elapsed at step 438, control module 6 provides accessor 14 with updated knowledge items 8 at step 434 in the form of a list or in any other suitable manner. Accessor 14 may then delete, discard, or remove unwanted knowledge items 8 from the list at step 436 to indicate that updating of these knowledge items 8 is no longer desired.

If accessor 14 has not yet completely used or applied any knowledge items at step 438, control module 6 enables a knowledge worker session for accessor 14 at step 433, and the method ends. If accessor 14 has completely used or applied at least one knowledge item 8 at step 438, control module 6 provides accessor 14 with a feedback form for each completed knowledge item 8 or otherwise requests feedback information 2 from accessor 14 concerning knowledge item 8 at step 440. If accessor 14 provides feedback information 2 at step 442, then control module 6 receives feedback information 2 at step 444 and communicates some or all feedback information 2 to score module 22 and incentive module 24 at step 446. Score module 22 evaluates feedback information 2 at step 448 as discussed more fully above with reference to FIG. 1 and, at step 450, incentive module 24 generates the appropriate incentives for accessor 14, supervisor 16 of accessor 14, and the organizational unit associated with accessor 14. The present invention contemplates incentive module 24 generating incentives at least in part according to values and other information from score module 22.

At step 452, if score module 22, incentive module 24, or another component of knowledge office 18 requires more feedback information 2 from accessor 14, the method returns to step 440, where accessor 14 is again prompted to provide feedback information 2. If additional feedback information 2 is not required at step 452, the method proceeds to step 433, where control module 6 enables a knowledge worker session for accessor 14, and the method ends. If accessor 14 does not provide appropriate feedback information 2 at step 442 and had declined to provide feedback information 2 at step 454, knowledge item 8 is removed from association with accessor 14 at step 456. In one embodiment, accessor 14 declining to provide feedback information 2 prevents an incentive from being generated to accessor 14 for using or applying knowledge item 8.

At step 460, control module 6 updates knowledge item record 32, employee records 34, organization records 36, and log record 50 at step 460 as appropriate. If accessor 14 has not provided feedback information 2 at step 442, but has not declined to provide any feedback information 2 at step 454, control module 6 retains the association between knowledge item 8 and accessor 14 for a specified period at step 458 and updates records 32, 34, 36, and 50 at step 460 as discussed above. After records 32, 34, 36, and 50 in database 30 have been updated, the method proceeds to step 433, where control module 6 enables a knowledge worker session for accessor 14, and the method ends. In this manner, system 10 manages, incents, and monitors the flow of intellectual capital, in the form of knowledge items 8 and appropriate activity concerning knowledge items 8, to the benefit of the organization, providing the organization with an advantage in the modern global economy.

Figure 5:
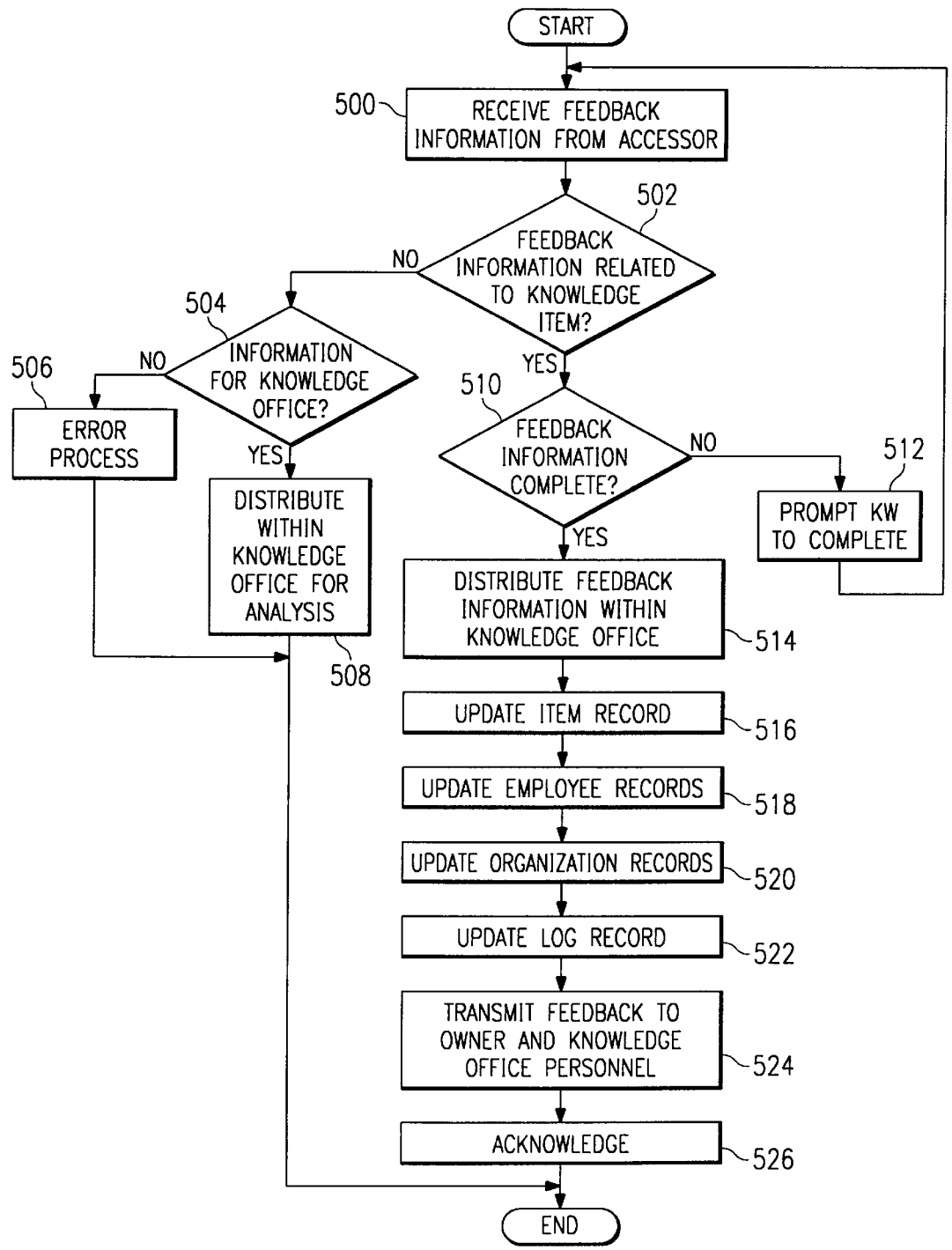
FIG. 5 is a flowchart illustrating an exemplary method of obtaining feedback information with respect to a knowledge item according to the present invention.

FIG. 5 is a flowchart illustrating an exemplary method of providing feedback information 2 for knowledge item 8 according to the present invention. The method begins at step 500, where control module 6 of knowledge office 18 receives feedback information 2 from accessor 14 using a feedback form or in any other suitable manner. If feedback information 2 does not relate to at least one knowledge item 8 at step 502, and the information received from accessor 14 is not appropriate for analysis within knowledge office 18 at step 504, control module 6 initiates a suitable error process at step 506, and the method ends. If feedback information 2 does not relate to at least one knowledge item 8 at step 502, but includes information that is appropriate for analysis within knowledge office 18 at step 504, control module 6 distributes this information to suitable components of knowledge office 18 for analysis at step 508, and the method ends.

If feedback information 2 relates to at least one knowledge item 8 at step 502, but feedback information 2 or the associated feedback form is not complete at step 510, control module 6 prompts accessor 14 to provide complete feedback information 2 at step 512, and the method returns to step 500. If feedback information 2 is complete at step 510, control module 6 distributes feedback information 2 within knowledge office 18 at step 514 as discussed more fully above with reference to FIGS. 1 and 4. Negative feedback information 2 may be analyzed more rigorously by selected components of knowledge office 18 than positive or neutral feedback information. Control module 6 updates item record 32 at step 516, employee records 34 at step 518, organization records 36 at step 520, and log record 50 at step 522 to reflect the existence, content, or any other aspect of feedback information 2, values 70 from scoring module 22, incentive information 72 from incentive module 24, and any other suitable activity information 74, as discussed above with reference to FIGS. 2a through 2c and FIG. 4.

At step 524, control module 6 may transmit feedback information 2 concerning knowledge item 8 to the owner of knowledge item 8, for example, submitter 12, and to any appropriate personnel associated with knowledge office 18. The present invention contemplates appropriate knowledge workers, such as submitter 12, receiving a substantially complete activity history for knowledge item 8. At step 526, control module 6 communicates an acknowledgment to accessor 14, which may include some information regarding incentives that incentive module 24 generated for accessor 14 as a result of the activity of accessor 14 in using or applying knowledge item 8 and providing subsequent feedback information 2 concerning knowledge item 8. After control module 6 communicates the acknowledgment at step 526, the method ends. Knowledge office 18 operates to incent the knowledge workers of the organization to generate, share, update, use or apply, and critically evaluate information to the benefit of the organization, providing a number of important technical advantages over existing systems for collecting and managing information.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A computer-based knowledge management system, comprising:
   a database containing a knowledge item and an activity record associated with the knowledge item;
   an accessor that accesses the knowledge item contained in the database and, in response, communicates feedback information concerning the content of the knowledge item; and
   a knowledge office that receives the feedback information, generates an incentive in response to the feedback information, and stores the incentive in the activity record.

2. The system of claim 1, further comprising a submitter that communicates the knowledge item to the knowledge office, the knowledge office generating the activity record in response to receiving the knowledge item.

3. The system of claim 1, wherein the activity record is selected from the group consisting of:
   a knowledge item record;
   an employee record; and
   an organization record.

4. The system of claim 1, wherein the knowledge office further comprises a scoring module that generates a value for the knowledge item according to the content of the feedback information.

5. The system of claim 4, wherein the knowledge office stores the value generated for the knowledge item in the activity record.

6. The system of claim 1, wherein the feedback information comprises an impact value associated with the content of the knowledge item.

7. The system of claim 1, wherein
   the incentive comprises an incentive credit for accumulation in the activity record according to a plurality of activities concerning the knowledge item; and
   the knowledge office compares accumulated incentive credits with a predetermined threshold and generates another incentive in response to the comparison.

8. The system of claim 1, wherein the incentive is selected from the group consisting of:
   an incentive for submitting the knowledge item;
   an incentive for accessing the knowledge item; and
   an incentive for providing the feedback information concerning the knowledge item.

9. A computer-based knowledge office, the knowledge office coupled to a database containing a knowledge item and an activity record associated with the knowledge item, the knowledge office comprising:
   a control module that receives feedback information concerning the content of the knowledge item from an accessor and communicates at least a portion of the feedback information;
   a scoring module coupled to the control module, the scoring module receiving the feedback information from the control module and generating a value for the knowledge item according to the content of the feedback information; and
   an incentive module coupled to the control module, the incentive module receiving the feedback information from the control module and generating an incentive in response to the feedback information for storage in the activity record.

10. The knowledge office of claim 9, wherein the activity record is selected from the group consisting of:
    a knowledge item record;
    an employee record; and
    an organization.

11. The knowledge office of claim 9, wherein the control module receives the knowledge item from a submitter, stores the knowledge item in the databases, and generates the activity record in the database.

12. The knowledge office of claim 9, wherein the feedback information includes an impact value associated with the knowledge item.

13. The knowledge office of claim 9, wherein
    the incentive comprises an incentive credit for accumulation in the activity record according to a plurality of activities concerning the knowledge item; and
    the incentive module compares accumulated incentive credits with a predetermined threshold and generates another incentive in response to the comparison.

14. A computer-based method for managing knowledge, comprising:
    receiving feedback information concerning the content of a knowledge item from an accessor, the knowledge item being stored in a database;
    generating a value for the knowledge item according to the content of the feedback information;
    storing the value in a first activity record in the database, the first activity record being associated with the knowledge item;
    generating an incentive in response to the feedback information; and
    storing the incentive in a second activity record in the database, the second activity record being associated with the knowledge item.

15. The method of claim 14, further comprising the steps of:
    receiving the knowledge item from a submitter;
    storing the knowledge item in the database; and
    establishing the first activity record.

16. The method of claim 14, wherein the first activity record is a knowledge item record and the second record is selected from the group consisting of:

an employee record; and an organization record.

17. The method of claim 14, wherein the feedback information comprises an impact value associated with the knowledge item.

18. The method of claim 14, wherein generating the incentive comprises generating an incentive credit for accumulation in the second activity record according to multiple activity concerning the knowledge item, the method further comprising the steps of:

comparing the accumulated incentive credits with a predetermined threshold; and generating another incentive in accordance with the comparison.

19. The method of claim 14, wherein the incentive is selected from the group consisting of:

an incentive for submitting the knowledge item;

an incentive for accessing the knowledge item; and an incentive for providing the feedback information concerning the knowledge item.

20. The method of claim 14, wherein generating the incentive comprises generating an incentive credit for accumulation in the second activity record according to a plurality of activities concerning the knowledge item, the method further comprising the step of communicating information concerning the accumulated incentive credits in the second activity record to a supervisor.

* * * * *